United States Patent [19]

Heinle

[11] Patent Number: 4,772,997
[45] Date of Patent: Sep. 20, 1988

[54] METHOD FOR STARTING UP A CONVERTER DRIVE COMPRISING AN INTERMEDIATE CURRENT LINK CONVERTER WITH PHASE SEQUENCE QUENCHING

[75] Inventor: Georg Heinle, Erlangen, Fed. Rep. of Germany

[73] Assignee: Siemens Aktiengesellschaft, München, Fed. Rep. of Germany

[21] Appl. No.: 69,269

[22] Filed: Jul. 2, 1987

[30] Foreign Application Priority Data

Jul. 18, 1986 [DE] Fed. Rep. of Germany ....... 3624388

[51] Int. Cl.[4] .................. H02M 5/00; H02M 7/00
[52] U.S. Cl. .................................. 363/49; 363/35; 318/430
[58] Field of Search .............. 363/35, 37, 49, 51, 363/96, 138; 318/798, 801–803, 810–811, 430, 431, 434

[56] References Cited

U.S. PATENT DOCUMENTS

| 4,455,599 | 6/1984 | Tamura et al. | 363/138 |
| 4,517,636 | 5/1985 | Uchino et al. | 363/138 |
| 4,521,840 | 6/1985 | Hoadley | 363/35 |
| 4,597,039 | 6/1986 | Alexander | 363/37 X |
| 4,620,296 | 10/1986 | Siemon | 363/37 X |

FOREIGN PATENT DOCUMENTS

| 0142808 | 8/1985 | European Pat. Off. . |
| 3237488 | 7/1984 | Fed. Rep. of Germany . |
| 2532796 | 10/1984 | France . |
| 1376758 | 3/1974 | United Kingdom . |

OTHER PUBLICATIONS

ETZ-A vol. 96, 1975, No. 11.
Patents Abstracts of Japan, Band 6, No. 155 (E-125) [1033], 7, Aug. 1982, and JPA5775579 (Tokyo Shibaura Denki K.K.) 1982.
IEEE Transactions on Industry Applications; Band 1A-16, No. 1, 1980, Y. U.S.; LIenau et al., "Power Converters for Feeding Asynchronous Traction Motors of Single Phase AC Vehicles" p. 104.
IEEE Proceedings Section, Band 131, No. 5, Sep. 1984; Survey GB, Bowes et al., "PWM Switching Strategies for Current-Fed Inverter Drives", pp. 195–202.

Primary Examiner—Peter S. Wong
Attorney, Agent, or Firm—Kenyon & Kenyon

[57] ABSTRACT

For setting in operation a converter drive for an asynchronous machine with an intermediate-current link and phase-sequence quenching, the commutations in the inverter are synchronized with the commutations in the controlled rectifier and/or all commutating capacitors are discharged before the start-up and/or the direction of commutation is cyclically changed during the startup. This makes it possible to start up the converter also if the intermediate-link current has gaps, and the asynchronous machine is loaded only with hunting torques.

12 Claims, 3 Drawing Sheets

METHOD FOR STARTING UP A CONVERTER DRIVE COMPRISING AN INTERMEDIATE CURRENT LINK CONVERTER WITH PHASE SEQUENCE QUENCHING

BACKGROUND OF THE INVENTION

The present invention relates to a method for starting up a converter drive for an electric-motor, in particular an asynchronous machine, the inverter part of which is equipped with commutating capacitors for phase-sequence quenching and which is fed via an intermediate link with a d-c current impressed via an intermediate link by an intermediate link inductance from a controlled rectifier where a short time before or immediately with the beginning of the inverter timing, a charging voltage is applied to one, several or all commutating capacitors, and subsequently, the intermediate link current is increased from a low starting value to the desired reference value.

The known, self-commutating converter to which the invention relates is shown in FIG. 1. The course of the commutations in the inverter part WR is described, for instance, in ETZ-A, Vol. 96, (1975) No. 11, on pages 520 to 523. For a further explanation of the operation, FIG. 2 shows part of the circuit in the form of an equivalent circuit diagram for the instant of the capacitor charge.

The commutations in the inverter part WR of the converter are made possible by the magnitude and the sign of the charges of the six commutating capacitors C13, C35, C15, C46, C62 and C42 shown in FIG. 1. which are arranged between two phases each in the upper and lower half of the inverter. It can be shown that it is not necessary to charge all commutating capacitors before starting up such a self-commutating inverter to the condition which corresponds to the normal operating point. It is rather sufficient, for instance, to pre-charge a capacitor and/or to make sure that all capacitors can charge up by themselves after the inverter is switched on. As a rule, however, the value of the intermediate link current must be kept so small at the beginning of the starting-up that the former can be commutated already with the aid of the first capacitor charge which may still be rather small. In the course of the subsequent commutations, this starting charge is distributed not only to the remaining capacitors. Rather, the charging state of all capacitors is improved by reversal processes internal to the inverter, especially by the gradual increase of the intermediate link current and by means of reversals internal to the inverter in such a manner that the normal operating state is finally reached. The maximally permissible value of the intermediate link current at the beginning of the start-up can, of course, be chosen to be larger, the more closely the pre-charge corresponds to the charging state necessary for the normal operating point.

For pre-charging, some circuits and operating methods which require no additional measures circuitwise have already become known.

Thus, DE-OS No. 29 52 324 describes a device, by which only one commutating capacitor is pre-charged in one-half of the bridge with the correct polarity. To this end, the charging voltage is taken off via a two-pole switch and a limiting resistor or via two semiconductor switches with a limiting resistor each, directly at the output of the controlled rectifier.

Of particular interest, however, are operating methods which avoid additional component costs and make do with the control and regulating devices which are already available in intermediate-link converters.

Thus, a method for "triggering" a converter with phase sequence quenching is known from German Patent No. 29 52 323. The inverter feeds an asynchronous machine at the output of an intermediate-current link converter. With the start-up, the maximally permissible intermediate-link current is limited upon starting-up initially to a small value and the inverter is at the same time timed with an increased frequency. The value of this frequency is obtained from the oscillation frequency of a tuned circuit formed by the commutating capacitors and the motor strand inductances. After a sufficiently high voltage has built up at the capacitor, the frequency is increased or decreased to the values provided for normal operation. The voltage naturally present in the intermediate link at the output of the d-c control element or controlled rectifier on the input side is utilized at the instant of starting-up for a first pre-charge of the capacitors.

In a further method that has become known from the Japanese publication with the File No. 51-109 950 in connection with "Patent Abstracts of Japan" Vol. 2, No. 70, page 2575E 78 the inverter is acted upon before it is put in operation, briefly at its input by a high voltage. For this purpose a reference value for the control device of the rectifier which can be controlled on the input side is temporarily increased in step-fashion. The pre-charge of the commutating capacitors is made possible by the simultaneous firing of one rectifier of the inverter half connected to the positive or negative potential, respectively. After the pre-charging voltage is removed and the intermediate-link current has decayed, the inverter operation is started with a small starting value to an intermediate link reference value which increases up to the desired end value.

However, it has been found in practice, that pre-charging the commutating capacitors or setting the converter in operation with limited intermediate-link current is not sufficient in all cases to reach the stationary operating point of the converter. Rather, the charging voltage that can be applied to the commutating capacitor may be so small that the charge caused thereby cannot commutate the starting value of the intermediate-link current occurring at the instant of starting up. In addition, the effects of the starting and pre-starting of the converter on the connected work-performing machine is neglected in all known devices and methods.

SUMMARY OF THE INVENTION

It is an object of the present invention to reduce the starting value of the intermediate-link current which is present at the instant of starting-up after an extended shut down or restarting after a temporary shut down of the converter. Thereby, the reliable starting of an inverter is to be made possible also if the charging voltage present at the commutating capacitors for building up their ability to commutate is rather small at the starting instant. The method according to the invention should be capable of being employed universally, and in particular, independently of how one, some or all commutating capacitors have been pre-charged prior to the start-up and are charged during the start-up. Furthermore, interfering influences on the work-performing machine are to be avoided during the start-up.

The above and other objects of the invention are achieved by a method for setting in operation a converter drive for an electric motor, particularly an asynchronous machine, the inverter part of which is provided with commutating capacitors for phase sequence quenching and which is supplied via an intermediate link with a d-c current impressed by an intermediate link inductance from a controlled rectifier, where a short time before or immediately with the start of the inverter timing a charging voltage is applied to one, several or all commutating capacitors, and subsequently the intermediate link current is increased from a low starting value to the desired reference value, wherein the commutations in the inverter part take place synchronized with the commutations in the controlled rectifier.

BRIEF DESCRIPTION OF THE DRAWINGS

In the following, the invention will be explained in greater detail with reference to the drawings in which.

DETAILED DESCRIPTION

Figure 2:
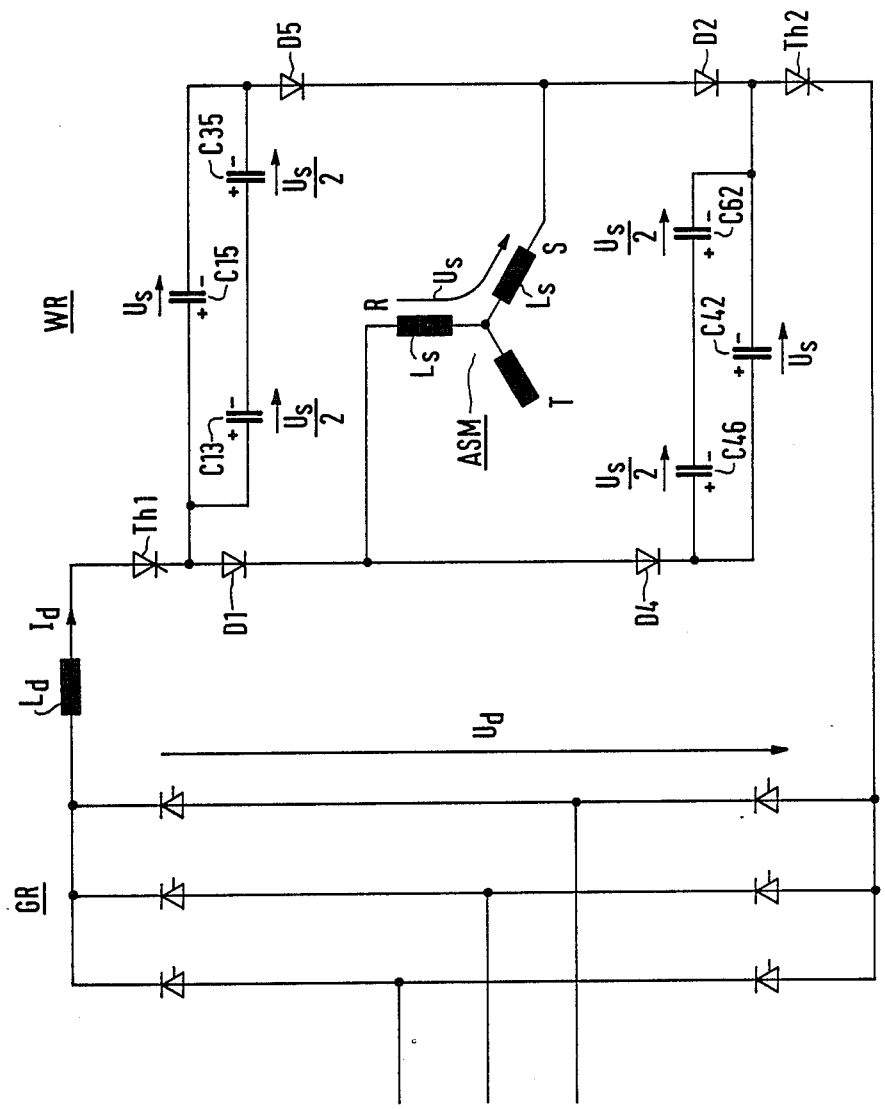
FIG. 2 shows the equivalent circuit diagram of FIG. 1.

It is a principle of all pre-charging methods that the charging voltage available for charging the commutating capacitors is determined by an inductive voltage divider. According to FIG. 2, in which the firing of the thyristors TH1 and TH2 is shown as an example, the output voltage $U_d$ of the controlled rectifier GR is divided via the intermediate-link inductance $L_d$ and the two strand inductances LS, connected in series, of the motor phases R and S of the asynchronous machine fed by the converter. The voltage drop $U_S$ occurring at these strand inductances leads to charging the commutating capacitors C15, C35, C13 and C46, C62, C42 in the upper or lower half of the inverter, respectively.

The capability of the inverter to commutate is determined, particularly at the instant of starting up by the charging state of these capacitors, i.e., by the part $U_S$ maximally attainable at the two strand inductances of the intermediate-link volta $U_d$. This value in turn limits the maximally permissible starting value of the intermediate-link current $I_d$. Its value can at most be so large that it can still be commutated by the capacitor charge supplied by the partial voltage $U_S$.

Figure 3:
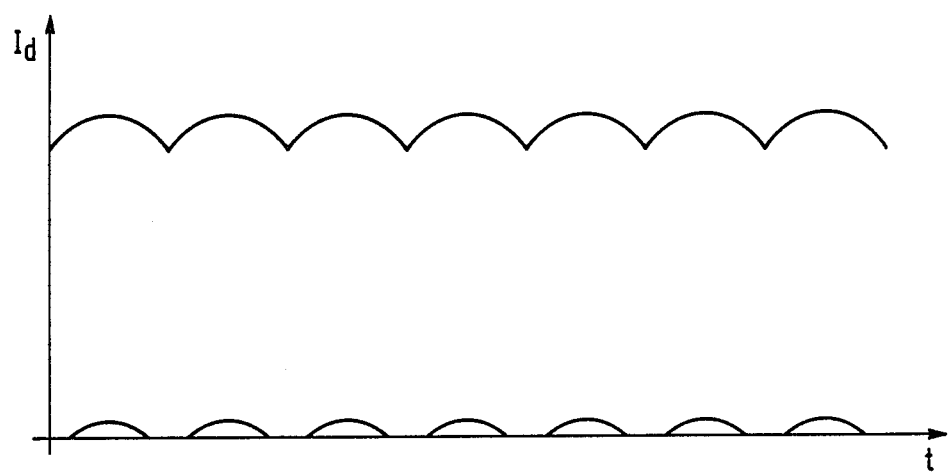
FIG. 3 shows waveforms of the intermediate-circuit current.

While in the case of standard motors, the value of each strand inductance does as a rule not fall below 15% of the nominal impedance, it can be very much smaller in special motors. Then, also the charging voltage for the commutating depositors turns out to be correspondingly small. Especially in such cases, the maximally permissible starting value of the intermediate-link current must in some circumstances be chosen so small that the current would have gaps due to the cusps caused by the commutations in the rectifier on the input side. These current cusps can be seen distinctly in FIG. 3. Two possible waveforms of the intermediate-link current are shown, of which one is located in the region of the gaps. However, the known pre-charge methods fail if the intermediate-link current has gaps. For example, if a current gap happens to coincide with a commutation, the charge being built up of the corresponding capacitor can be dissipated and subsequent commutations can fail.

The method according to the invention of synchronizing the switching processes in the inverter with those of the rectifier, on the other hand, permits an ideal matching of the maximally permissible starting point in the intermediate link to the value of the actually generatable pre-charging voltage. This value is now no longer limited downwards by reaching the gap region. A reliable start of the inverter is now possible in all cases also if the pre-charging voltages are very small.

In a further embodiment of the method according to the invention it is particularly advantageous if the commutations of the machine strand currents take place always in the region in which the intermediate-link current has a maximum due to the commutations in the rectifier on the input side.

Figure 1:
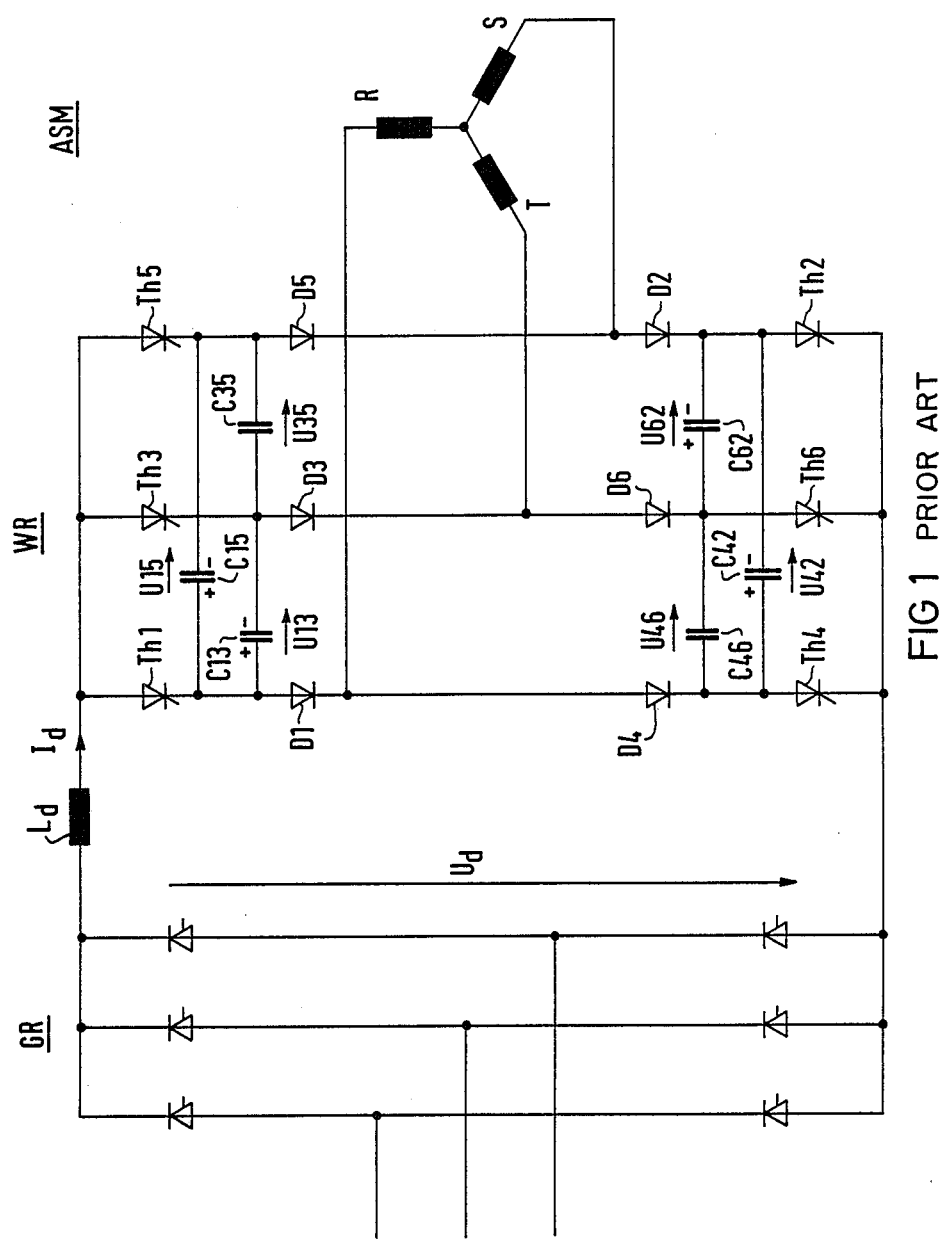
FIG. 1 shows a typical converter drive for an electric motor.

As is shown in the already cited ETZ-A on pages 521 and 522 in detail, the course of the commutation for a converter according to FIG. 1, can be divided into two sections. The first one begins with the firing of the thyristor following in the commutating direction. After a neglegibly short time, the intermediate-link current is commutated to the latter, so that the thyristor which up to then was carrying current is shut off almost suddenly. This is caused by the charge of the capacitor connected between the two participating phases. The current flow in the leads of the electric machine is initially not influenced thereby, since the charge of the commutating capacitors must first be reversed by the intermediate-link current, and the current commutation proper in the machine strands begins if the sign of the voltage of the capacitor connected between the two inverter phases is reversed and reaches a value which corresponds to the linked voltage impressed between the two phases by the electric machine. If the machine is standing still, the time of the sign change of the capacitor voltage is governed correspondingly, since no electromotive force is induced.

This synchronization of the switching processes is particularly advantageous since the intermediate-link current is still rising during the first commutating step. Thereby, its duration is increased which is beneficial for the recovery time of the thyristor extinguished at the beginning of this interval. In addition, the strand commutation takes place with a large current so that the capacitor has the highest possible state of charge at the end of the commutation. Thereby, the starting behavior of the converter is particularly aided since the commutating capacitors receive the total charge required for steady state operation of the inverter faster.

Finally, the synchronization of the switching processes in the inverter according to the invention with those in the rectifier can also be carried out with a fraction of the frequency with which the commutations in the rectifier take place, or also periodically. Thus, any desired number of commutations of the rectifier, if necessary, can take place between two synchronized commutations of the inverter. This is made possible by the provision that the charging state of the capacitors reached at the end of a commutation is "stored" by the circuit so that the commutations need not follow each other immediately. For this reason, no conditions must be observed in principle for the time sequence of the inverter commutations down to the recovery periods of the components. In particular, the commutation frequency of the inverter need not be adjusted to fast charge reversal processes internal to the inverter in which the commutating capacitor and the machine windings participate as capacitive and inductive energy storage devices.

If the commutating capacitors still have a residual charge, for instance, before the inverter is restarted, it may be necessary in some circumstances to limit the starting value of the intermediate-link current until far into the gap region.

For this reason it is particularly advantageous, according to a further embodiment of the invention, to discharge all capacitors completely before starting up. Thereby, defined starting conditions are created and the maximally permissible intermediate-link current need not be reduced additionally. This has the further advantage that the inverter reaches the steady-state operating condition faster. Since no internal charge equalization processes takes place, the capacitor charges can build up undisturbed with each further commutation up to the steady-state final value. These capacitor discharges are carried out particularly advantageously if all thyristors of the inverter and two series-connected rectifiers of the rectifier are fired. In order to avoid overcurrents, however, an intermediate-link current which may still be present due to a preceding converter operation must have decayed and the value of the motor voltages induced between the terminals by the asynchronous machine still running down must have fallen below a predetertimed limit. This value is as a rule in the order of 10% of the nominal motor voltage.

It is also conceivable to apply the measure of discharging the capacitors independently of the synchronization of the inverter and recitifier commutations. This has the advantage that in some circumstances the maximally permissible starting value of the intermediate-link current can be chosen larger already from the start of the operation or in spite of a relatively small charging voltage.

In a further embodiment of the invention it is particularly advantageous if the inverter is not set in operation with a fixed direction of commutation. Rather, the direction of commutation can be changed cyclically. To this end, one or more commutations can be carried out by the pair of rectifiers fired in the starting state, for instance, in the direction corresponding to a clockwise rotation of the motor. After the direction of commutation is reversed, the commutation takes place past the original starting state with the same number of commutations with counterclockwise rotation of the motor until the direction of commutation is changed again. Also with such a cyclic process about the starting commutation state, the converter can be changed without limitation to its normal operating state by letting the commutating capacitors be charged up to the steady-state operating point. In the asynchronous machine operated by the converter, the hunting torques caused thereby do not bring about a rotation of the motor. This is of advantage particularly if in the case of restarting, the motor has not yet run down completely or rotates with approximately the commutation frequency with a small amount of slippage. Of advantage is furthermore the formation of flux in the machine which is possible in this case. Here, too, it is conceivable and possibly advantageous to apply the measure of a cyclic change of the direction of commutation independently of the sychronization of the inverter and rectifier commutations and the capacitor discharges prior to start-up.

The method according to the invention therefore makes it possible to set in operation in a particularly advantageous manner a converter drive with an asychronous machine operated with phase sequence quenching via an intermediate-link current converter.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method for starting the operation of a converter drive for an electric motor load, particularly an asynchronous machine, the converter drive comprising a controlled rectifier adapted to be coupled to an a-c network, an intermediate link and an inverter coupled to the intermediate link, the inverter being provided with a plurality of commutating capacitors for phase sequence quenching and being supplied by the intermediate link with a d-c current impressed by an intermediate-link inductance from the controlled rectifier, the operation of said inverter being controlled by an inverter timing sequence, the method comprising the steps of applying, a short time before or immediately with the start of the inverter timing sequence, a charging voltage to at least one of the commutating capacitors, and subsequently increasing the intermediate-link current from a low starting value to a desired reference value, and further comprising the step of synchronizing the commutations in the inverter with the commutations in the controlled rectifier.

2. The method recited in claim 1, wherein a commutation in the inverter is synchronized with a commutation in the controlled rectifier and wherein in the vicinity of maximums of cusps of the intermediate-link current caused by the commutations in the rectifier, the output current of the inverter commutates from one phase to another.

3. A method for starting the operation of a converter drive for an electric-motor load, particularly an asynchronous machine, the converter drive comprising a controller rectifier adapted to be coupled to an a-c network, an intermediate link and an inverter coupled to the intermediate link, the inverter being provided with a plurality of commutating capacitors for phase sequence quenching and being supplied by the intermediate link with a d-c current impressed by an intermediate-link inductance from the controlled rectifier, the operaiton of said inverter being controlled by an inverter timing sequence, the method comprising the steps of applying, a short time before or immediately with the start of the inverter timing sequence, a charging voltage to at least one of the commutating capacitors and subsequently increasing the intermediate-link current from a low starting value to a desired reference value, and further comprising the step of discharging all commutating capacitors before the charging voltage is applied.

4. The method recited in claim 3, wherein, for discharging the commutating capacitors, all rectifiers of the inverter and two series-connected rectifiers of the controlled rectifier are fired if the intermediate-link current has decayed and the voltages between phases of the load at the output of the inverter are smaller than a predetermined limit.

5. The method recited in claim 3, further comprising synchronizing the commutations in the inverter with the commutations in the controlled rectifier.

6. The method recited in claim 5, wherein a commutation in the inverter is synchronized with a commutation in the controlled rectifier such that in the vicinity of a maximum of cusps of the intermediate linked current caused by the commutations in the controlled rectifier, the output current of the inverter is commutated from one phase to another.

7. A method for starting the operation of a converter drive for an electric-motor load, especially an asynchronous machine, the converter drive comprising a controlled rectifier adapted to be coupled to an a-c network, an intermediate link and an inverter coupled to the intermediate link, the inverter being provided with a plurality of commutating capacitors for phase sequence quenching and being supplied by the intermediate link with a d-c current impressed by an intermediate link inductance from the controlled rectifier, the operation of said inverter being controlled by an inverter timing sequence and the invention having a commutation direction comprising one of a first commutation direction and a second opposite commutation direction, the method comprising the steps of applying, a short time before or immediately with the start in a starting state of the inverter timing sequence in one of said first and second commutation directions, a charging voltage to at least one of the commutating capacitors and subsequently increasing the intermediate-link current from a low starting value to a desired reference value, and further comprising the step of cyclically changing the commutation direction by commutating with a number of commutations corresponding to the number of commutations in the one of said first and second directions past the starting state into the other of said first and second directions.

8. The method recited in claim 7, wherein the number of commutations from the starting state in the one and the other direction is one.

9. The method recited in claim 7, further comprising synchronizing the commutations in the inverter with the commutations in the controlled rectifier.

10. The method recited in claim 9, wherein a commutation in the inverter is sychronized with a commutation in the controlled rectifier such that in the vicinity of maximums of cusps of the intermediate-link current caused by the commutations in the rectifier, the output current of the inverter is commutated from one phase to another.

11. The method recited in claim 7, further comprising discharging all commutating capacitors before the charging voltage is applied.

12. The method recited in claim 11, wherein, for discharging the commutating capacitors, all rectifiers of the inverter and two series-connected rectifiers of the controlled rectifier are fired if the intermediate-link current is zero and the voltages between phases of the load at the output of the inverter are smaller than a predetermined limit.

* * * * *